(12) United States Patent
Shimada et al.

(10) Patent No.: US 10,315,458 B2
(45) Date of Patent: Jun. 11, 2019

(54) DECORATED PART AND A METHOD FOR MANUFACTURING THE SAME

(71) Applicant: TRINITY INDUSTRIAL CORPORATION, Aichi (JP)

(72) Inventors: Tokinobu Shimada, Aichi (JP); Yukihiro Goto, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 7 days.

(21) Appl. No.: 15/319,819

(22) PCT Filed: Dec. 1, 2014

(86) PCT No.: PCT/JP2014/081706
§ 371 (c)(1),
(2) Date: Dec. 19, 2016

(87) PCT Pub. No.: WO2016/006140
PCT Pub. Date: Jan. 14, 2016

(65) Prior Publication Data
US 2017/0136809 A1  May 18, 2017

(30) Foreign Application Priority Data
Jul. 8, 2014 (JP) .................................. 2014-140226

(51) Int. Cl.
*D06N 7/04* (2006.01)
*B44C 1/22* (2006.01)
(Continued)

(52) U.S. Cl.
CPC .......... *B44C 1/228* (2013.01); *B23K 26/0006* (2013.01); *B23K 26/0626* (2013.01);
(Continued)

(58) Field of Classification Search
CPC .... B44C 1/228; B23K 26/352; B23K 26/355; B23K 26/3568; B23K 26/3576;
(Continued)

(56) References Cited

U.S. PATENT DOCUMENTS 5,306,360 A     4/1994  Bharti et al.
2014/0027412 A1*  1/2014  Kato .................... B21C 51/005
                                                        219/121.61

FOREIGN PATENT DOCUMENTS

JP    2001-334374    12/2001
JP    2010-105386    5/2010
(Continued)

*Primary Examiner* — Maria V Ewald
*Assistant Examiner* — Zachary M Davis
(74) *Attorney, Agent, or Firm* — Clark & Brody (57) ABSTRACT

This invention aims at providing a decorated-part of which a design of three-dimensional effect is drawn onto the decorative-surface of a part material, thus improving design-quality. A design (4), consisting of a plurality of the same fine regularly arranged basic-pattern (5), is drawn onto the decorative-surface (3a) of the automobile interior-part (1) of this invention. The fine basic-pattern (5) consists of the first-graphic (8) drawn including the first laser-processed groove (6a) and of the second-graphic (9) located in the region surrounded by the first laser-processed groove (6a) and drawn including the second laser-processed groove (6b). The inner-surface roughness (Ra1) of the first laser-processed groove (6a) is greater than the decorative-surface roughness (Ra3) where the fine basic-pattern (5) does not exist on said decorative-surface (3a) (Ra1>Ra3). The inner-surface roughness (Ra2) of the second laser-processed groove (6b) is greater than the inner-surface roughness (Ra1) of the first laser-processed groove (6a) (Ra2>Ra1).

9 Claims, 9 Drawing Sheets

(51) Int. Cl.
*B23K 26/364* (2014.01)
*B23K 26/082* (2014.01)
*B23K 26/06* (2014.01)
*B23K 26/00* (2014.01)
*B23K 26/402* (2014.01)
*B44F 1/02* (2006.01)
*B23K 26/359* (2014.01)
*B23K 26/352* (2014.01)
*B23K 101/00* (2006.01)
*B23K 103/16* (2006.01)
*B23K 103/18* (2006.01)
*B23K 103/00* (2006.01)

(52) U.S. Cl.
CPC .......... *B23K 26/082* (2015.10); *B23K 26/352* (2015.10); *B23K 26/355* (2018.08); *B23K 26/359* (2015.10); *B23K 26/364* (2015.10); *B23K 26/402* (2013.01); *B44F 1/02* (2013.01); *B23K 2101/006* (2018.08); *B23K 2103/172* (2018.08); *B23K 2103/18* (2018.08); *B23K 2103/42* (2018.08)

(58) Field of Classification Search
CPC .. B23K 26/3584; B23K 36/359; B41M 5/267; B41M 5/24; B41M 5/245; B41M 5/26
USPC ........................................... 216/65; 428/141
See application file for complete search history.

(56) References Cited

FOREIGN PATENT DOCUMENTS

| | | |
|---|---|---|
| JP | 2010-202435 | 9/2010 |
| JP | 2011-098858 | 5/2011 |
| JP | 2012-176744 | 9/2012 |
| WO | 2012/132653 | 10/2012 |

\* cited by examiner

FIG. 17

DECORATED PART AND A METHOD FOR MANUFACTURING THE SAME

TECHNICAL FIELD

This invention relates to a decorated-part on which a design is drawn by irradiating a laser onto the decorative-surface of the surface-layer of a part material, and to a method for manufacturing such decorated-part.

TECHNICAL BACKGROUND

To improve the quality of the design of automobile interior-parts, the decorated-parts (i.e. console-boxes, instrument-panels, armrests or the like), of which a decoration is added onto the surface of a resin-compact, are nowadays put to practical use. As a decorative-method for adding decoration to such decorated-parts, a laser-drawing process is conventionally suggested (see, for example, Patent Document 1). Laser drawing is a decorative-method by which a laser is irradiated onto the surface of a part, and that the heat emitted by such a laser changes the surface of that part, thus drawing a design thereon. As shown in Patent Document 1, a carbon-like design is drawn onto the surface of a resin-compact of an automobile-interior part.

As shown in Patent Document 2, a laser is irradiated onto the surface of a laminated-body of a decorated-part, thus forming a fine concave-convex part by melting and ablation and thus realizing a hologram-type design.

PRIOR ARTS

Patent Documents

Patent Document 1: Japanese published unexamined application No. 2012-176744
Patent Document 2: Japanese published unexamined application No. 2010-105386

SUMMARY OF THE INVENTION

Problems to be Solved by the Invention

The conventional laser-drawing as described above is a processing-method for drawing a design by changing the surface-condition of the resin, i.e. by melting the resin-surface, by foaming the resin-surface, and by changing the color of the resin-surface or the like. However, variation in designs is still limited by such a laser-drawing process. To increase variation in designs, it is considered to create another drawing method that can provide a deep three-dimensional visual-effect (a stereoscopic-effect).

This invention was achieved in light of the foregoing problems and provides a decorated-part of which a design of three-dimensional effect is drawn onto the decorative-surface of a part material, thus improving design-quality, and provides a method for manufacturing the same decorated-part.

Means for Solving the Problems

As a means (i.e. means 1) for solving the above problems, there is a decorated-part of which a design, consisting of a plurality of the same fine regularly arranged basic-pattern, is drawn onto the decorative-surface of the surface-layer of a part material, characterized in that the fine basic-pattern consists of a first-graphic that is drawn, including a first laser-processed groove, and of a second-graphic, located in the region surrounded by the first-graphic, that is drawn including the second laser-processed groove; and thereof such grooves, the inner-surface roughness (Ra1) of the first laser-processed groove is greater than the decorative-surface roughness (Ra3) wherever the fine basic-pattern does not exist on said decorative-surface, and that the inner surface roughness (Ra2) of the second laser-processed groove is greater than the inner-surface roughness (Ra1) of the first laser-processed groove.

Of the means 1 of this invention, the design drawn on the decorative-surface of the part-material shows a plurality of the same fine regularly arranged basic-pattern. A single fine basic-pattern constituting the design consists of a first-graphic that is drawn including a first laser-processed groove and a second-graphic located in the region surrounded by the first graphic that is drawn including the second laser-processed groove. Of the decorative-surface, wherever the fine basic-pattern does not exist, laser-processed grooves are not formed, thus minimizing the roughness (Ra3) of the decorative-surface. Thus, of the fine basic-pattern, the inner-surface roughness (Ra1) of the first laser-processed groove is greater than the roughness (Ra3) of the decorative-surface wherever the fine basic-pattern does not exist. Also, the inner-surface roughness (Ra2) of the second laser-processed groove is greater than the inner-surface roughness (Ra1) of the first laser-processed groove. Of the fine basic-pattern of this invention, light is specularly reflected from the first laser-processed groove of the first-graphic located outermost, since the inner-surface roughness (Ra1) of said groove is comparatively small and smooth. Also, the reflection-direction of the light reflected from the first laser-processed groove inner-surface is different from that of the light reflected from where the fine basic-pattern does not exist. Thus, there exists an angle of reflection of which light is specularly reflected and another angle of reflection of which light is not specularly reflected from the inner-surface of the first laser-processed groove. As such, a change in viewing-angle makes a difference in viewing light reflected from the inner-surface of the first laser-processed groove than of that viewed being reflected from the decorative-surface. On the other hand, regarding the fine basic-pattern of this invention, the inner-surface roughness (Ra2) of the second laser-processed groove of the medially located second-graphic is great and rough. Thus, the reflection of the light is not much different even if the viewing angle is changed. Therefore, in drawing the fine basic-pattern in combination of the first-graphic (first laser-processed groove) and the second-graphic (second laser-processed groove), which are different in surface-roughness, it possible to add the effect of a three-dimensional look (depth-feeling) and texture or the like to the design on the decorative-surface, according to the difference of the reflection of the light. Also, a plurality of the fine basic-pattern of three-dimensional effect are regularly arranged on the decorative-surface, thus fully improving the design-quality of the decorated-part.

The inner-surface roughness (Ra1) of the first laser-processed groove should preferably be less than 0.1 µm. The inner-surface roughness (Ra2) of the second laser-processed groove should preferably be 0.2 µm or more. As such, a three-dimensional effect of the fine basic-pattern can surely be obtained by changing the inner-surface roughness (Ra1, Ra2) of each laser-processed groove. Thus, the inner-surface roughness (Ra1) of the first laser-processed groove should preferably be 0.01 µm or more and less than 0.1 µm. More preferably, it should be 0.02 µm or more and less than 0.05 µm. The inner-surface roughness (Ra2) of the second laserprocessed groove should preferably be 0.2 μm or more and less than 0.4 μm. More preferably, it should be 0.25 μm or more and less than 0.35 μm.

The size of the fine basic-pattern is not especially limited. It can be 5 mm square or less. Hence, the first laser-processed groove of the first-graphic and the second laser-processed groove of the second-graphic can be formed linearly to a width of 100 μm or less. Therefore, a plurality of the laser-processed groove consisting of the first laser-processed groove and second laser-processed groove makes it surely possible in drawing the fine basic-pattern of 5 mm square or less. However, the size of the fine basic-pattern can be 3 mm square or less.

Both the first-graphic and second-graphic constituting the fine basic-pattern can either be an open or closed homothetic-graphic, in planar-view. It is possible to form a plurality of the second-graphic inside the first-graphic to make the fine basic-pattern by such the first-graphic and plurality of the second-graphic, in which case both the first-graphic and plurality of the second-graphic can be a closed homothetic-graphic in planar-view. Regarding such a fine basic-pattern, the first-graphic, which is larger and arranged outermost, is formed of the first smooth-surface laser-processed groove. The plurality of the second-graphic, which is smaller and arranged inside (the first-graphic), is formed of the second rough-surface laser-processed groove, thus making it surely possible in realizing a three-dimensional fine basic-pattern.

It is possible to arrange the first and the second graphic eccentrically from the center of the fine basic-pattern, or still possible to arrange those graphics such that each is partially overlapped. Furthermore, the first and second graphics can be a circle in planar-view and constitute a fine basic-pattern representing (i.e. imitating) a dimple (a dent). Specifically, regarding the fine basic-pattern representing a dimple, the first and second circular-graphics are eccentrically arranged from the center of the fine basic-graphic such that each is partially overlapped. As such, the fine basic-pattern representing the dimple can be expressed according to the difference in reflected light from the inner-surface of each laser-processed groove, thus obtaining the feeling of depth nearly equal to that of an actual dimple.

To increase the variation of decorations in this invention, the width of the first laser-processed groove can either be smaller or larger than that of the second laser-processed groove. Of course, the width of the first and second laser-processed grooves can be the same. The width of each laser-processed groove should preferably be 30 μm through 110 μm, thus making it surely possible in drawing the first and second graphics of the fine basic-pattern.

As a means (i.e. means 2) for solving the above problems, there is a method for manufacturing a decorated-part according to the aforementioned means 1 by a laser-irradiation process of which a design consisting of a plurality of the same fine basic-pattern regularly arranged is drawn onto the decorative surface of the surface-layer of a part-material, characterized in that during the laser-irradiation process, a laser is irradiated under the condition that the energy-level of the laser irradiated in forming the second laser-processed groove is set higher than that energy-level per-unit area of the laser irradiated in forming the first laser-process groove.

The means 2 of this invention allows for the formation of the first laser-processed groove of the first-graphic and of the second laser-processed groove of the second-graphic such that the inner-surface roughness (Ra2) of the second laser-processed groove is greater than the inner-surface roughness (Ra1) of the first laser-processed groove. As such, in drawing the fine basic-pattern in combination of the first laser-processed groove and second laser-processed groove of different surface roughness (Ra1, Ra2), it is possible to add the effect of a three-dimensional look (depth-feeling) and texture or the like to the design on the decorative-surface, according to the difference in reflected light from the inner surface of each laser-processed groove. Also, a plurality of the fine basic-pattern of three-dimensional effect are regularly arranged on the decorative-surface, thus fully improving the design-quality of the decorated-part.

As a means (i.e. means 3) for solving the above problems, there is a method for manufacturing a decorated-part according to the aforementioned means 1 by a laser-irradiation process of which a design consisting of a plurality of the same fine basic-pattern regularly arranged is drawn onto the decorative-surface of the surface-layer of a part-material, characterized in that during the laser-irradiation process, a laser is irradiated in a unicursal manner under the condition that the energy-level of the laser irradiated in forming the second laser-processed groove is set higher than that energy-level per-unit area of the laser irradiated in forming the first laser-process groove.

The means 3 of this invention allows for the formation of the first laser-processed groove of the first-graphic and of the second laser-processed groove of the second-graphic such that the inner-surface roughness (Ra2) of the second laser-processed groove is greater than the inner-surface roughness (Ra1) of the first laser-processed groove. As such, in drawing the fine basic-pattern in combination of the first laser-processed groove and second laser-processed groove of different surface-roughness (Ra1, Ra2), it possible to add the effect of a three-dimensional look (depth-feeling) and texture or the like to the design on the decorative-surface according to the difference in reflected light from the inner surface of each laser-processed groove. Also, a plurality of the fine basic-pattern of a three-dimensional effect is regularly arranged on the decorative-surface, thus fully improving the design-quality of the decorated-part. Additionally, by irradiating the laser in a unicursal manner, each laser-processed groove is formed, thus efficiently drawing the fine basic-pattern consisting of the first and second graphic in a short time.

Effects of the Invention

As described above, any one of the means 1 to 3 of this invention makes it possible in drawing a design of three-dimensional effect on the decorative-surface of a part material, thus improving the design quality.

MODES FOR CARRYING OUT THE INVENTION

Hereinafter, the embodiment of this invention, an automobile decorated-part, is described in reference to the drawings.

Figure 1:
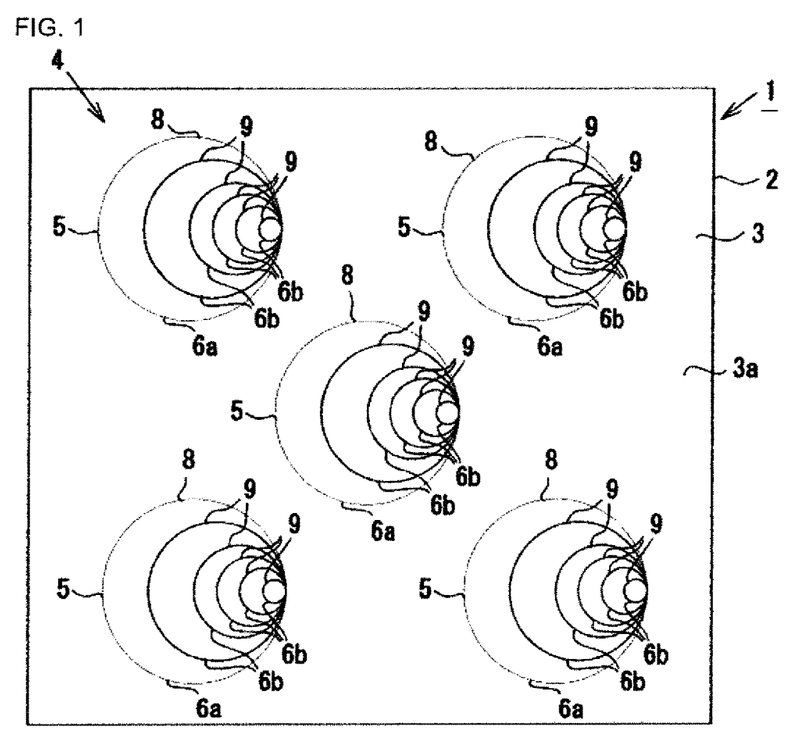
FIG. 1 is the flat-view showing the automobile interior-part as the embodiment of this invention.
Figure 2:
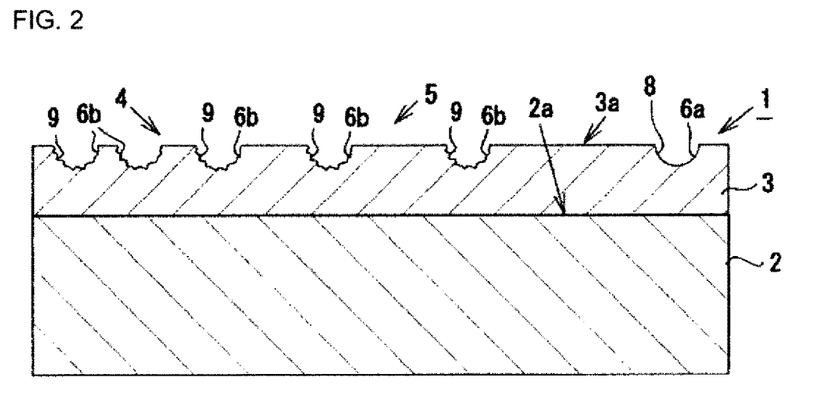
FIG. 2 is the enlarged cross-sectional view showing the automobile interior-part.

As shown in FIGS. 1 and 2, the automobile interior-part 1 (decorated-part) comprises a resin-compact 2 (part-material) and a coat-layer 3 that is formed to cover the surface 2a of the resin-compact 2. Of the automobile interior-part 1, the design 4 is drawn onto the surface 3a (decorative-surface) of the coat-layer 3 that is located on the surface-layer of the resin-compact 2. The automobile interior-part 1 is an interior-part making-up the armrest of an automobile door. The resin-compact 2 is a resin molding formed of an ABS resin. The coat-layer 3 covering the surface of the resin-compact 2 is formed of e.g. a high-gloss black (piano-black) paint. The design 4 is drawn onto the coat-layer 3 by laser-irradiation processing (specifically, laser-ablation processing). Laser-ablation processing means a non-heating processing in which a laser is irradiated onto a solid surface to achieve the phenomenon of the solid surface being chipped off by evaporating the atoms, molecules and clusters without melting the solid surface.

Figure 3:
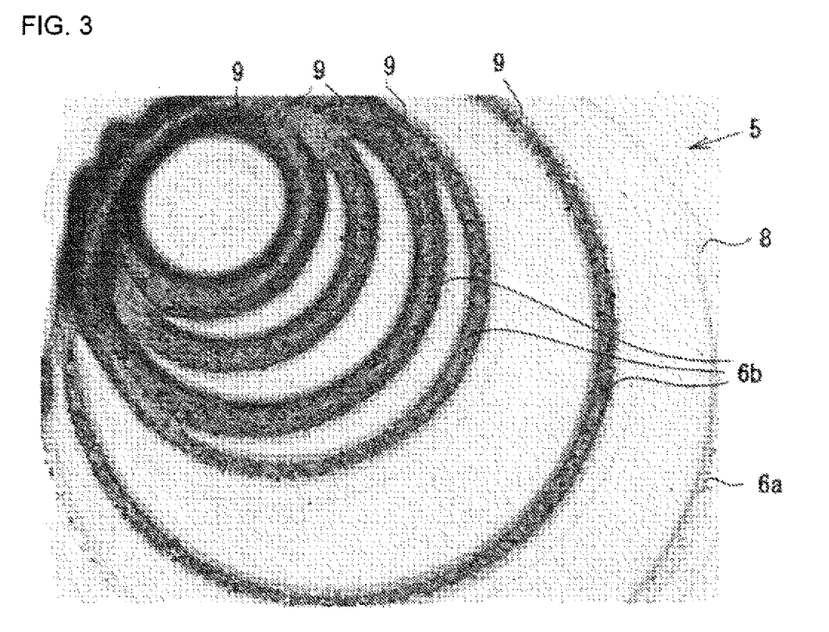
FIG. 3 is the explanatory-image showing the microscopic-photograph of the fine basic-pattern.

The design 4 of the embodiment of this invention is one of which a plurality of the fine basic-pattern 5 representing a dimple (dent) is regularly arranged. As shown in FIGS. 1 and 3, the fine basic-pattern representing a single dimple is drawn by multiple laser-processed grooves (6a, 6b) (e.g. six different grooves employed for the embodiment of this invention). Specifically, the fine basic-pattern 5 consists of the first-graphic 8 that is drawn including the first laser-process groove 6a and a second-graphic 9 that is located in the region surrounded by the first laser-processed groove 6a and drawn including the second laser-processed groove 6b. The first-graphic 8 and a plurality of the second-graphic 9 are both a closed homothetic-graphic in planar-view. The largest circular-graphic located outermost within the fine basic-pattern 5 is the first-graphic 8. The plurality of the circular-graphic (e.g. the five different circles employed in this invention) located within the first-graphic is the second-graphic 9. The size of the fine basic-pattern 5 of the embodiment of this invention is approximately 4 mm. In other words, the diameter of the first-graphic 8 which is the largest within the fine basic-pattern 5 is approximately 4 mm. The width and depth of the first and second laser-processed grooves are approximately 50 μm and 2 μm, respectively.

The first-graphic 8 and the plurality of the second-graphic 9 are eccentrically arranged from the center of the fine basic-pattern 5 and partially overlap each other. On the opposite side of such overlapping graphics 8 and 9, the interval spaces between them increase in size. Such interval spaces are wider in the outer-side and smaller in the inner-side of the fine basic-pattern 5.

The inner-surface roughness Ra1 of the first laser-processed groove 6a on which the first-graphic 8 is drawn is greater than the decorative-surface roughness Ra3 wherever the fine basic-pattern 5 does not exist on said decorative-surface 3a of the coat-layer 3 (i.e. Ra1>Ra3). Also, the inner-surface roughness Ra1 of the second laser-processed groove 6b on which the second-graphic 9 is drawn is greater than the inner-surface roughness Ra1 of the first laser-processed groove 6a (i.e. Ra2>Ra1). Specifically, the inner-surface roughness Ra1 of the first laser-processed groove 6a is 0.02 μm or more, and less than 0.1 μm, and the inner-surface roughness Ra2 of the second laser-processed groove is 0.2 μm through 0.5 μm. Also, the decorative-surface roughness Ra3 wherever the fine basic-pattern 5 does not exist on said decorative-surface is less than 0.02 μm.

Figure 4:
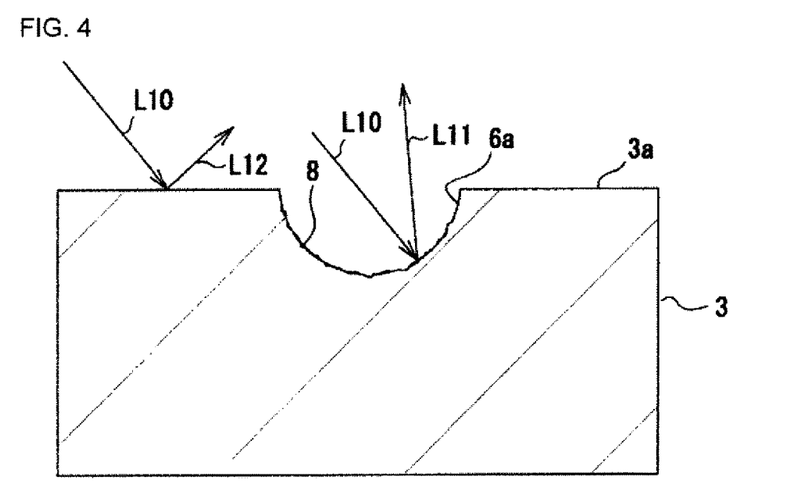
FIG. 4 is the explanatory-view showing the reflected light from the smooth surface of the first laser-processed groove.
Figure 5:
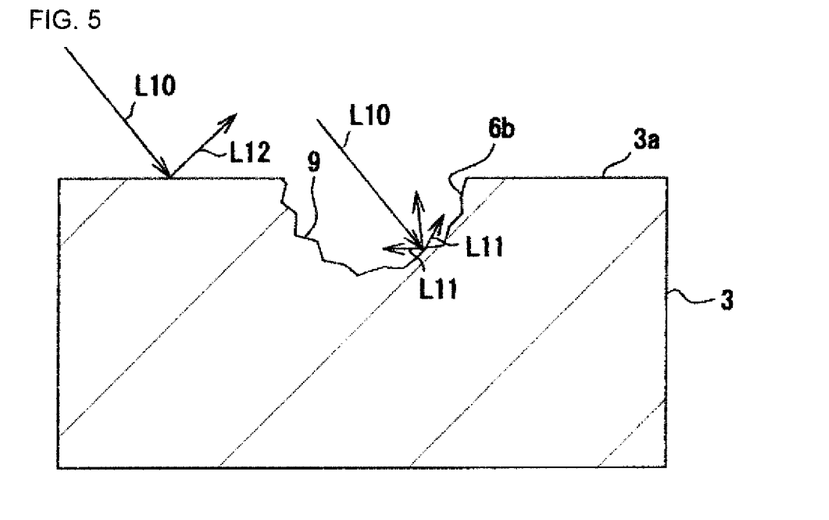
FIG. 5 is the explanatory-view showing the reflected light from the rough surface of the second laser-processed groove.

As such, of the fine basic-pattern 5 of the embodiment of this invention, the first-graphic 8 is drawn by the first laser-processed groove of a smooth inner-surface (see FIGS. 2 and 4), and the plurality of the second-graphic 9 is drawn by the second laser-processed groove 6b of a rough inner-surface (see FIGS. 2 and 5).

As shown in FIG. 4, the inner surface of the first laser-processed groove 6a is smooth. Thus, the light L10 reflects specularly from the inner-surface thereof. The direction of the specular-reflected light L11 from the first laser-processed groove 6a is different from that of the specular-reflected light L12 from the decorative-surface wherever the first laserprocessed groove 6a is not formed (wherever the fine basic-pattern 5 does not exist). Thus, the visual effect of the specular-reflected light L11, L12 changes according to the incidence-angle of the light L10. Thus, the angle of the specular-reflected lights L11, L12 is different according to the incidence angle of the light L10.

As shown in FIG. 5, the inner-surface of the second-laser processed-groove 6b is rough, so that the specular-reflected light L11 reflecting from the groove 6b is weak. Thus, the specular-reflected light L11 shows little change in intensity, even if the incidence-angle of the light L10 should change. As such, if the laser-processed grooves 6a, 6b of different inner-surface roughness (Ra1, Ra2) are formed within a single, fine basic-pattern 5, the intensity of the specular-reflected light changes according to one's viewing-angle, thus obtaining on the fine basic-pattern 5 the effect of a three-dimensional look (depth-feeling) like that of an actual dimple.

Figure 6:
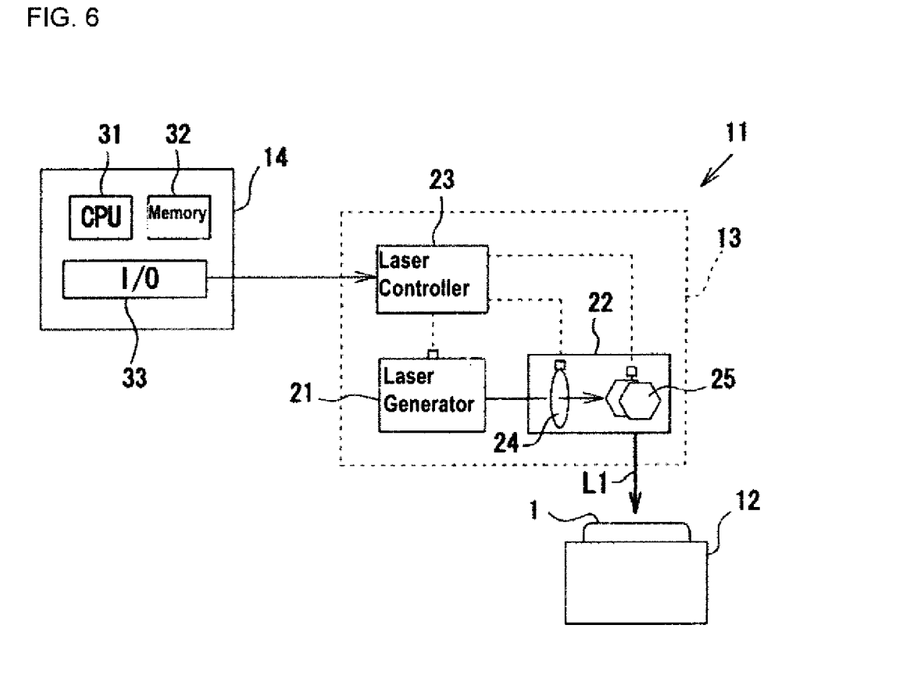
FIG. 6 is the skeleton-framework showing the decorative-making apparatus.

FIG. 6 shows the decorative-making apparatus 11 for drawing the design 4 onto the automobile interior-part 1. The decorative-making apparatus 11 of the embodiment of this invention comprises a supporting-table 12 for supporting the automobile interior-part 1; a laser-irradiation device 13 for irradiating the laser L1 onto the surface of said automobile interior-part 1; and a controller 14 for controlling the laser-irradiation device 13.

The laser-irradiation device 13 comprises a laser-generator 21 for generating the laser L1 (e.g. a $YVO_4$ laser at wavelength 1,064 nm); a laser deflector 22 for deflecting said laser L1; and a laser-controller 23 for controlling the laser-generator 21 and laser-deflector 22. The laser-deflector 22 is an optical system for adjusting the irradiation-position and focal point of the laser L1 by changing the position of the lens 24 and reflecting-mirror 25. The laser-controller 23 controls the laser-generator 21 and laser-reflector 22 in adjusting the laser-irradiation condition of the laser L1, such as the irradiation-intensity and scanning-velocity.

The controller 14 consists of a widely-known computer comprising a CPU 61, a memory 32 and an input-output port 33 or the like. The controller 14 is electrically connected to the laser-irradiation device 13 for controlling such laser-irradiation device 13 according to the various activating signals.

The design-data, according to the fine basic-graphic 5 of the design 4 and to the irradiation-parameter indicating the laser-irradiation condition of the laser-irradiation device 13 (i.e. the irradiation-time, the irradiation-intensity and the spot-diameter of the L1 or the like), is stored within the controller 14 in advance. The controller 14 controls the laser-irradiation device 13 according to the design-data stored in the memory 32, thus enabling the decoration of the design 4 onto the automobile interior-part 1.

Hereinafter, a decorative method for adding the design 4 onto the surface 3a of the coat-layer 3 of the automobile interior-part 1 is described.

First, a three-dimensional resin-compact 2 is prepared using a thermoplastic resin (an ABS resin in this invention). Next, an operator sets such resin-compact 2 onto the supporting-table 12. Then, a coat-layer 3 is formed to cover the surface of the resin-compact 2. Specifically, in forming the coat-layer 3, the CPU31 generates an activating-signal and emits such signal to a coating-machine (not shown in the drawings). Then, according to the activating-signal of the coat-layer data being emitted from the CPU31, paint is sprayed onto the surface 2a of the resin-compact 2 by the coating-machine, thus forming the coat-layer 3.

After that, the laser-irradiation device 13 is activated to irradiate the laser L1 onto the surface 3a (decorative-surface) of the coat-layer 3 on the resin compact 2, thus drawing the design 4 onto the surface 3a (laser-irradiation process). Specifically, the CPU31 reads from the memory 32 the laser-irradiation data for irradiating the laser L1. Then, the CPU31 generates the activating-signal based on such laser-irradiation data and emits such activating-signal to the laser-irradiation device 13. The laser-irradiation device 13, according to the activating-signal being emitted from the CPU31, irradiates the laser L1 onto the coat-layer 3 that was formed on the surface 2a of the resin-compact 2. Also, at this time, according to the image-data of the design 4, the laser-controller 23 of the laser-irradiation device 13, in controlling the laser-deflection, irradiates the laser L1 being powered by the laser-generator 21. Such procedural control by the laser-controller 23 includes determining the scanning-position and focal-position of the laser L1.

Of the embodiment of this invention, the laser L1 is irradiated in a unicursal manner such that the scanning-position of the laser L1 overlaps part of the first-graphic 8 and the second-graphic 9 under the condition that the energy-level of the laser L1 irradiated in forming the second laser-processed groove 6b is set higher than that energy-level per-unit area of the laser L1 that was irradiated in forming the first laser-process groove 6a. Specifically, the outermost laser-processed groove 6a is first drawn by irradiating the laser L1 with the laser-output level being turned down and then gradually being turned up to form sequentially the inner-plurality of the second laser-processed groove 6b, thus drawing a single, fine basic-pattern 5. Also, wherever each of the laser-processed groove 6a, 6b of the fine basic-pattern overlap, the laser-energy output is suspended, or the laser-energy level is set weaker, thus adjusting the processing-level to realize a uniform look of the fine basic-patter 5.

By irradiating the laser L1 onto the surface 3a of the coat-layer 3 within the drawing-region of the design 4, the plurality of the fine basic-pattern 5 is drawn sequentially vertically and horizontally at regular intervals. As such, the automobile interior-part 1 as shown in FIGS. 1 and 2 is achieved.

On the surface 3a of the coat-layer 3 of the automobile interior-part 1 as described above, the inner-surface roughness Ra of each laser-processed groove 6a, 6b that comprise the fine basic-pattern 5 is measured. Chart 1 shows the result of such measurement. Hence, in selecting the arc-shaped bottom-part, the deepest position within each laser-processed groove 6a, 6b according to the height-data within the measured range obtained by a laser-microscope, the average-roughness Ra is calculated arithmetically as Ra1, Ra2 of each inner-surface according to the height-data of the plural measurement-points along the arc-shaped bottom-part of groove 6a, 6b.

CHART 1

| Position of the processed groove | Arithmetic average roughness Ra(μm) |
| --- | --- |
| ① | 0.304 |
| ② | 0.210 |
| ③ | 0.358 |
| ④ | 0.290 |
| ⑤ | 0.282 |
| ⑥ | 0.058 |

As shown in Chart 1 the surface-roughness Ra2 of the second laser-processed groove 6b, located innermost (first from the inner-side) within the fine basic-pattern 5, is 0.304 μm. The surface-roughness Ra2 of the second laser-processed groove 6b, located in the second-position from the inner-side, is 0.21 μm. The surface-roughness Ra2 of the second laser-processed groove 6b, located in the third-position from the inner-side, is 0.358 μm. The surface-roughness Ra2 of the second laser-processed groove 6b, located in the fourth position from the inner-side, is 0.29 μm. The surface-roughness Ra2 of the second laser-processed groove 6b, located in the fifth-position from the inner-side, is 0.282 μm. The surface-roughness Ra1 of the first laser-processed groove 6b, located in the outermost (sixth-position from the inner-side), is 0.058 μm. As such, it was verified in the embodiment of this invention that the surface-roughness Ra1 of the first laser-processed groove 6a is 0.1 μm or less, and that the inner-surface roughness Ra2 of the plurality of the second laser-processed groove 6b is 0.2 μm or more.

Therefore, the embodiments as described above realize the following effects.

(1) Regarding the automobile interior-part 1 of the embodiment of this invention, in drawing the fine basic-pattern 5, the first-graphic 8 (first laser-processed groove 6a) and the second-graphic 9 (second laser-processed groove 6b) of different surface roughness Ra1 and Ra2 are interlaced, thus making it possible to add various effects such as a three-dimensional effect (depth-feeling) or the like that relates visibly to the fine basic-pattern 5, thus increasing the variation of decorations by laser-drawing. Also, the three-dimensional regular arrangement of the plurality of the fine basic-pattern 5 on the surface 3a of the coat-layer 3 makes it fully possible to enhance the design-quality of the automobile interior-part 1.

(2) Regarding the embodiment of this invention, the inner-surface roughness Ra2 of the first laser-processed groove 6a is less than 0.1 μm, and the inner-surface roughness Ra2 of the second laser-processed groove 6b is 0.2 μm or more. As such, a difference in the inner-surface roughness Ra1, Ra2 of the laser-processed groove 6a, 6b makes it surely possible to obtain a three-dimensional effect of the fine basic-pattern 5.

(3) Regarding the embodiment of this invention, the first-graphic 8 and the second-graphic 9 are both a planar-view circle and are eccentrically arranged from the center of the fine basic-pattern 5. Also, such eccentrically arranged graphic 8, 9 partially overlap each other. As such, the fine basic-pattern 5 looking like a dimple (dent) can be shown according to the difference in reflection of the inner-surface of each laser-processed groove 6a, 6b, thus expressing the feeling of depth nearly equal to that of an actual dimple.

(4) In the laser-irradiation process of the embodiment of this invention, the laser is irradiated under the condition that the energy-level of the laser irradiated in forming the second laser-processed groove 6b is set higher than the energy-level per-unit area of the laser irradiated in forming the first laser-process groove 6a, thus making it surely possible in forming each laser-processed groove 6a, 6b such that the inner-surface roughness Ra2 of the second laser-processed groove 6b is greater than the inner-surface roughness Ra1 of the first laser-processed groove 6a.

(5) In the laser-irradiation process of the embodiment of this invention, the laser is irradiated in a unicursal manner to form each laser-processed groove 6a, 6b, thus efficiently drawing the fine basic-pattern 5 consisting of the first-graphic 8 and the second-graphic 9 in a short time.

The embodiments of this invention can be modified, as described below.

Figure 7:
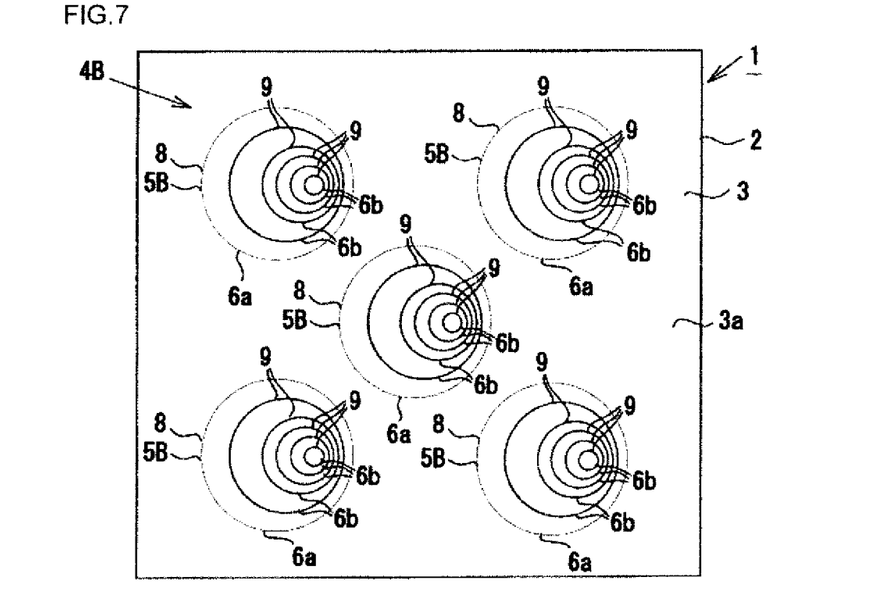
FIG. 7 is the flat-view showing the automobile interior-part on which the design as the embodiment of this invention is drawn.
Figure 8:
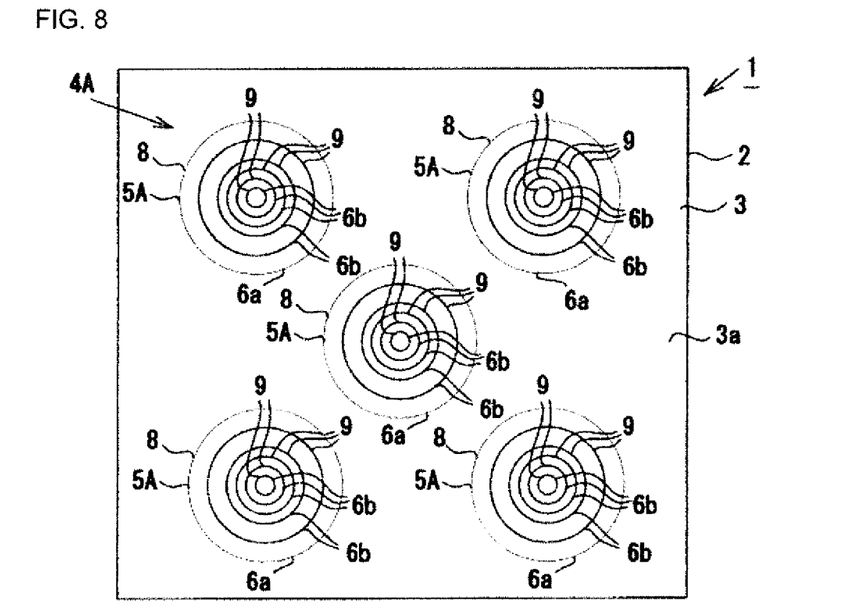
FIG. 8 is the flat-view showing the automobile interior-part on which the design as another embodiment of this invention is drawn.

As described in the above embodiment of this invention, the first-graphic 8 and the plurality of the second-graphic 9 constituting the fine basic-pattern 5 of the design 4 is a circular-graphic that partially overlaps each other. However, it is not limited to this. Specifically, as the plurality of the fine basic-pattern 5A as shown in FIG. 7, or as the plurality of the fine basic-pattern 5B as shown in FIG. 8, it is possible to form the design 4A, 4B by drawing the first-graphic 8 and the plurality of the second-graphic 9 that do not overlap each other. As shown in FIG. 7, each of the first-graphic 8 and the plurality of the second-graphic 9 of the fine basic-pattern 5A can be arranged in a concentric way share the center of the fine basic-pattern 5A. As shown in FIG. 8, each of the first-graphic 8 and the plurality of the second-graphic 9 of the fine basic-pattern 5B can be eccentrically arranged with interval spaces from the center of the fine basic-pattern 5B. Also, the fine basic-pattern 5A, 5B consisting of the first-graphic 8 and the plurality of the second-graphic 9 is a circular-graphic of the same size as the above embodiment, and that the inner-surface roughness Ra1, Ra2 of the first laser-processed groove 6a of the first-graphic 8 and of the second laser-processed groove 6b of the second-graphic 9 are the same as the roughness of the above embodiment. Even if the design 4A, 4B is drawn in the regular arrangement of the fine basic-patterns 5A, 5B as shown in FIGS. 7 and 8, a three-dimensional effect can be added to the design 4A, 4B, thus fully enhancing the design-quality of the automobile-part 1.

As described in the above embodiment of this invention, the first-graphic 8 and the plurality of the second-graphic 9 constituting the fine basic-pattern 5, 5A, 5B of the design 4, 4A, 4B are each a circular graphic. However, it is not limited to this. It is possible to make a fine basic-pattern of a quadrangular or triangular graphic. FIGS. 9 to 12 specifically show the design 4C, 4D, 4E constituting a fine basic-pattern of the quadrangular-shaped first-graphic 8A and second-graphic 9A. Also, FIGS. 13 to 16 specifically show the design 4F, 4G, 4H constituting the fine basic-pattern 5F, 5G, 5H of the triangular-shaped first-graphic 8B and second-graphic 9B. Also, FIG. 10 is the enlarged photographic-image of the actual surface of the decorative-surface 3a on which the design 4C consisting of the plurality of quadrangular-shaped fine basic-pattern 5C is drawn. FIG. 14 is the enlarged photographic-image of the actual surface of the decorative-surface 3a on which the design 4F consisting of the plurality of the triangular-shaped fine basic-pattern 5F is drawn.

Figure 9:
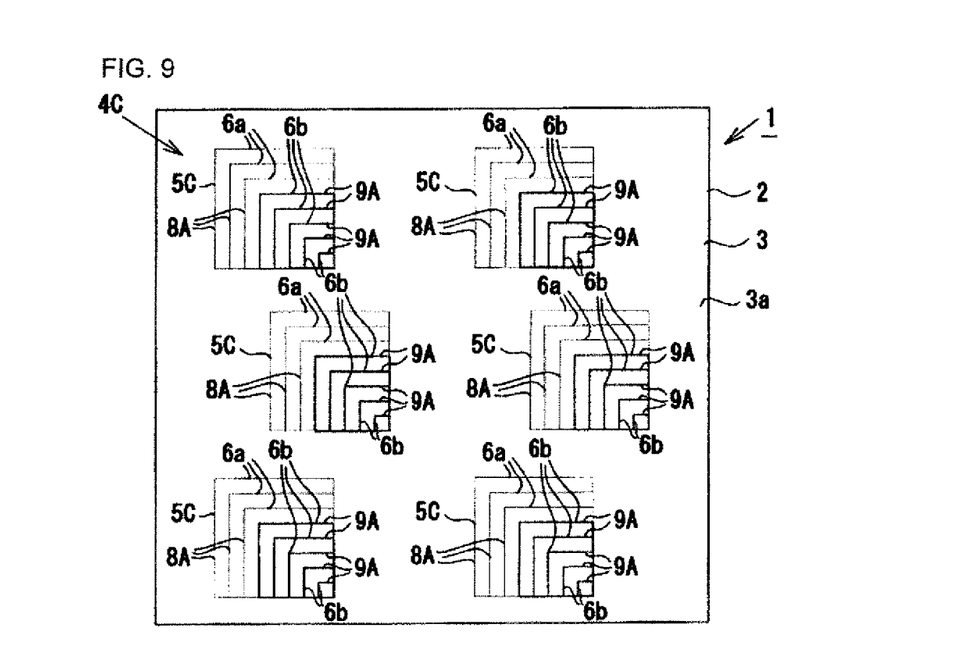
FIG. 9 is the flat-view showing the automobile interior-part on which the design as yet another embodiment of this invention is drawn.
Figure 10:
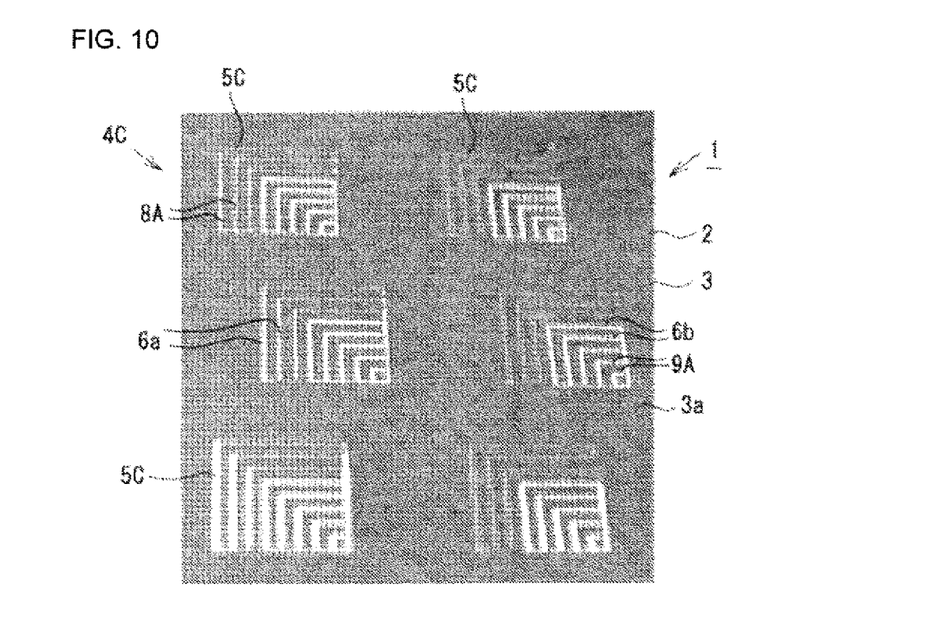
FIG. 10 is the explanatory-view showing the enlarged-photograph of the fine basic-pattern as yet another embodiment of this invention.
Figure 11:
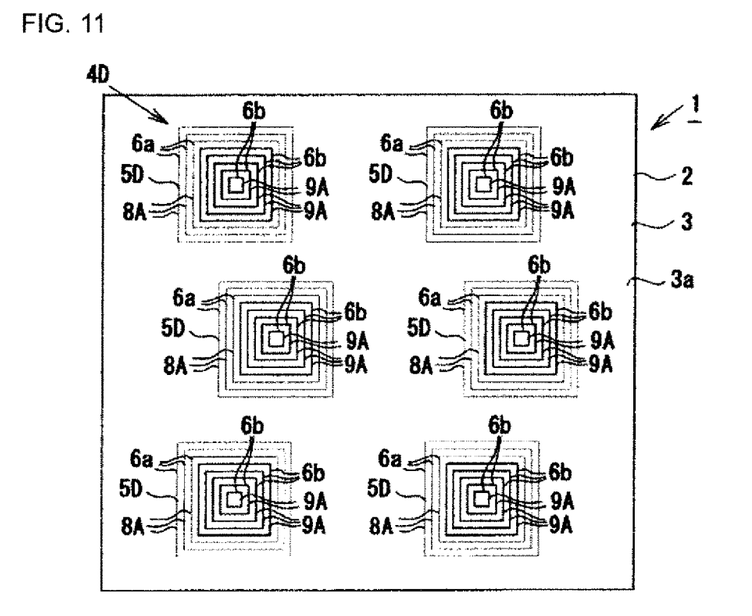
FIG. 11 is the flat-view showing the automobile interior-part on which the design as yet another embodiment of this invention is drawn.
Figure 12:
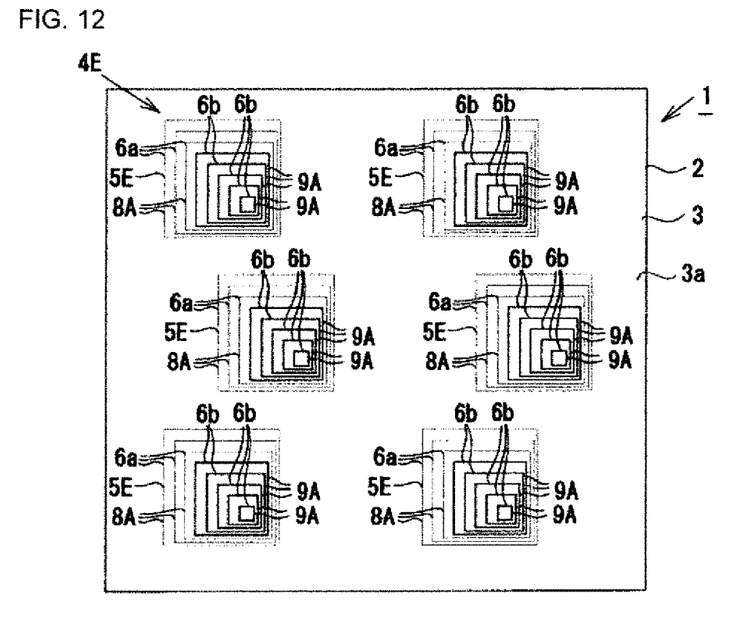
FIG. 12 is the flat-view showing the automobile interior-part on which the design as yet another embodiment of this invention is drawn.

As shown in FIGS. 9 to 12, each fine basic-pattern 5C, 5D, 5E consists of three graphics of the first-graphic 8A comprising the first laser-processed groove 6a and of five graphics of the second-graphics 9A that are located in the region surrounded by the first-graphic 8A and drawn including the second laser-processed groove 6b. The first-graphic 8A and the second-graphic 9A are both a homothetic-quadrangular graphic in planar-view. As the same as the above embodiment of this invention, the inner-surface roughness Ra2 of the second laser-processed groove 6b, in drawing the second-graphic 9A, is greater than the inner-surface roughness Ra1 of the first laser-processed groove 6a in drawing the first-graphic 8A. Regarding the fine basic-pattern 5C as shown in FIGS. 9 and 10, the plurality of the first-graphic 8A and the plurality of the second-graphic 9A are both eccentrically arranged from the center of the fine basic-pattern 5C and partially (two of four sides meeting perpendicularly) overlap each other. Regarding the fine basic-pattern 5D as shown in FIG. 11, both of the plurality of the first-graphic 8A and the plurality of the second-graphic 9A are arranged in a concentric way and share the center of the fine basic-pattern 5D. Regarding the fine basic-pattern 5E as shown in FIG. 12, both of the plurality of the first-graphic 8A and the plurality of the second-graphic 9A are both eccentrically arranged with interval spaces between them from the center of the fine basic-pattern 5E.

Figure 13:
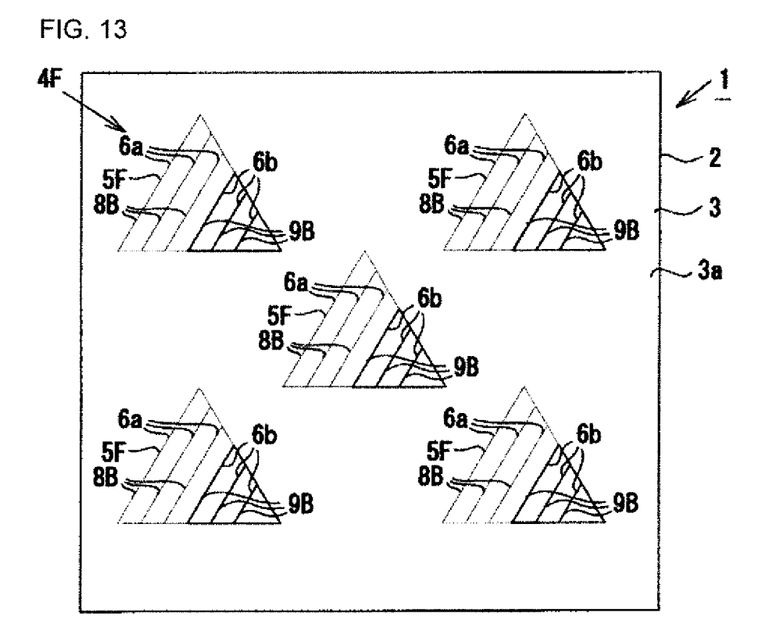
FIG. 13 is the flat-view showing the automobile interior-part on which the design as yet another embodiment of this invention is drawn.
Figure 14:
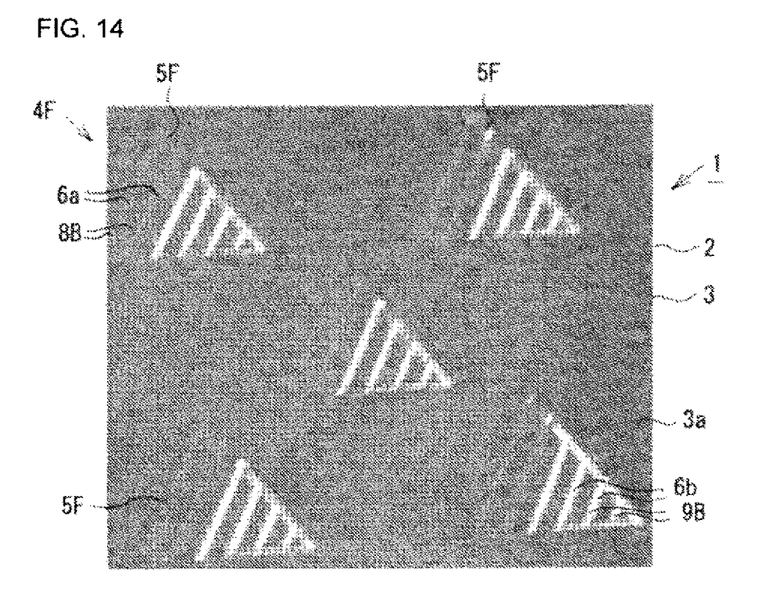
FIG. 14 is the explanatory-view showing the enlarged-photograph of the fine basic-pattern as yet another embodiment of this invention.
Figure 15:
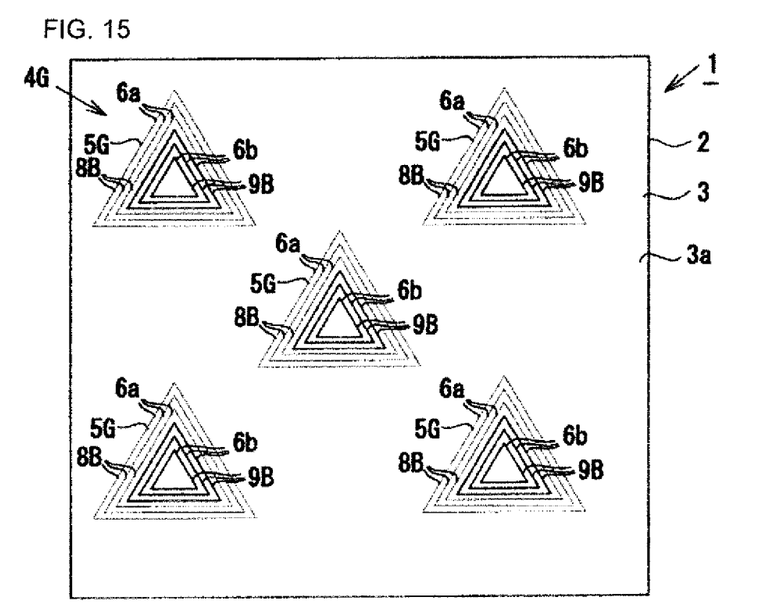
FIG. 15 is the flat-view showing the automobile interior-part on which the design as yet another embodiment of this invention is drawn.
Figure 16:
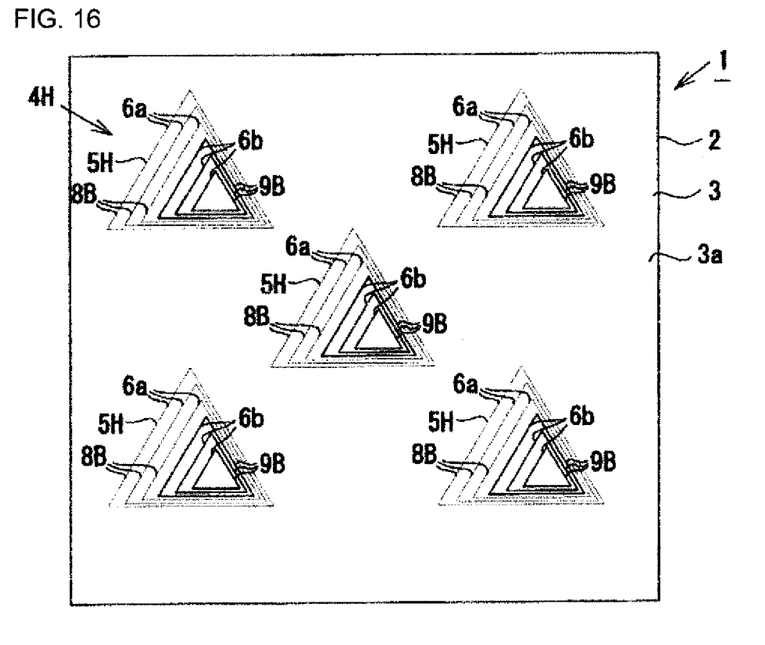
FIG. 16 is the flat-view showing the automobile interior-part on which the design as yet another embodiment of this invention is drawn.

As shown in FIGS. 13 to 16, the fine basic-pattern 5F, 5G, 5H consist of three graphics of the first-graphic 8B comprising the first laser-processed groove 6a and of three graphics of the second-graphics 9B that are located in the region surrounded by the first-graphic 8B and drawn including the second laser-processed groove 6b. The first-graphic 8B and the second-graphic 9B are both a homothetic-triangular graphic in planar-view. As the same as the above embodiment of this invention, the inner-surface roughness Ra2 of the second laser-processed groove 6b, in drawing the second-graphic 9B, is greater than the inner-surface roughness Ra1 of the first laser-processed groove 6a in drawing the first-graphic 8B. Regarding the fine basic-pattern 5F as shown in FIGS. 13 and 14, the plurality of the first-graphic 8B and the plurality of the second-graphic 9B are both eccentrically arranged from the center of the fine basic-pattern 5F and partially (two of three sides) overlap each other. Regarding the fine basic-pattern 5G as shown in FIG. 15, the plurality of the first-graphic 8B and the plurality of the second-graphic 9B are both arranged concentrically and share the center of the fine basic-pattern 5G. Regarding the fine basic-pattern 5H as shown in FIG. 16, the plurality of the first-graphic 8B and the plurality of the second-graphic 9B are both eccentrically arranged with interval spaces between them from the center of the fine basic-pattern 5H.

Even if the designs 4C to 4H are drawn in the regular arrangement of the fine basic-patterns 5C to 5H as shown in FIGS. 9 to 16, the three-dimensional effect can be added to the designs 4C to 4H, thus fully enhancing the design-quality of the automobile-part 1.

Figure 17:
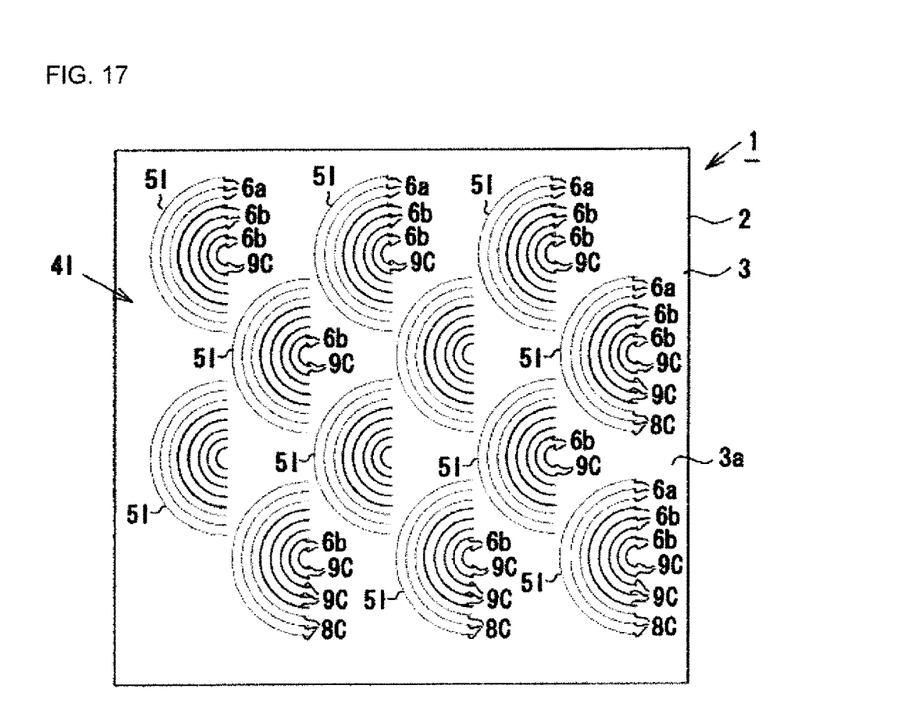
FIG. 17 is the flat-view showing the automobile interior-part on which the design as yet another embodiment of this invention is drawn.

As described in the above embodiment, the fine basic-pattern 5, 5A to 5H are all made by the closed-homothetic first-graphic 8, 8A, 8B and by the closed-homothetic second-graphic 9, 9A, 9B. However, such a first-graphic and second-graphic are not limited to this. FIG. 17 shows an example of the fine basic-pattern 5I. As the design 4I as shown in FIG. 17, the fine basic-pattern 5I is made of three graphics of the first-graphic 8C that is drawn by the first laser-processed groove 6a, and of five graphics of the second-graphic 9C that are located in the region surrounded by the first-graphic 8C and drawn by the second laser-processed groove 6b. The first-graphic 8C and the second-graphic 9C are both homothetic semicircular-shaped in planar-view. As such, even if the design 4I is drawn in the regular arrangement of the fine basic-pattern 5I, the three-dimensional effect can be added to the designs 4I, thus fully enhancing the design-quality of the automobile interior-part 1.

As described above, in the laser-irradiation process, the first laser-processed groove 6a is formed by irradiating the laser L1 with the laser-energy output-level being turned down. The second laser-processed groove 6b is formed by irradiating the laser L1 with the laser-energy output-level being turned up. However, it is not limited to this. For instance, it is possible to increase the scanning-rate of the laser L1 without changing the laser-energy output to form the first laser-processed groove 6a. Also, it is possible to decrease the scanning-rate of the laser L1 to form the second laser-processed groove 6b. The energy-level per-unit area of the irradiating-laser can be changed even by adjusting the scanning-rate of the laser L1, thus making it possible to form the first laser-processed groove 6a and the second laser-processed groove 6b of different surface-roughness, respectively. Also, it is possible to form the first laser-processed groove 6a and the second laser-processed groove 6b by adjusting the scanning-rate of the laser-output. Even in this case, it surely possible to form the first laser-processed groove 6a and the second laser-processed groove 6b of different surface-roughness, respectively.

As described in the above embodiment of this invention, the designs 4, 4A to 4I (fine basic-patterns 5, 5A to 5I) are drawn on the surface 3a of the black coat-layer 3. However, the designs 4, 4A to 4I can be drawn on the surface of any color coat-layer, depending on the design. Also, the designs 4, 4A to 4I can be formed on a coat-layer that is formed by plating or by evaporation-coating other than on a coat-layer formed by plain-coating. Also, the designs 4, 4A to 4I can be drawn directly onto the surface 2a of the resin-compact 2 without the coat-layer 3 covering the surface 2a of the resin-compact 2.

As described in the above embodiment, the automobile interior-part 1 is embodied as the armrest of an automobile door. However, it is possible that the automobile interior-part 1 be embodied as a different automobile decorated-part, such as a console-box or an instrument panel or the like. Of course, it is possible to apply this invention to a decorated-part other than that of an automobile interior-part 1, such as to a decorative-panel for furniture or for electrical appliances or the like.

Besides the technical ideas of this invention, as described above, other technical ideas to be understood are described hereinafter.

(1) A decorated-part according to the means 1 of this invention, characterized in that the width of the first laser-processed groove is the same as that of the second laser-processed groove.

(2) A decorated-part according to the means 1 of this invention, characterized in that the width of the first laser-processed groove is less than that of the second laser-processed groove.

(3) A decorated-part according to the means 1 of this invention, characterized in that the width of the first laser-processed groove is greater than that of the second laser-processed groove.

(4) A decorated-part according to the means 1 of this invention, characterized in that the first-graphic and the second-graphic are both quadrangular shaped in planar-view.

(5) A decorated-part according to the means 1 of this invention, characterized in that the first-graphic and the second-graphic are both triangular shaped in planar-view.

(6) A decorated-part according to the means of this invention, characterized in that the first-graphic and the second-graphic are both semicircular shaped in planar-view.

(7) A decorated-part according to the means 1 of this invention, characterized in that the first-graphic and the second-graphic are both closed-homothetic shaped, both arranged concentrically, and both share the center of the fine basic-pattern.

(8) A method for manufacturing a decorated-part according to the means 2 of this invention, characterized in that the decorated-part is an automobile interior-part.

DESCRIPTION OF THE REFERENCE NUMERALS

1: Automobile interior-part as the decorated-part,
2: Resin-compact as the part material
3a: Surface of the coat-layer as the decorative-surface
4, 4A to 4I: Design
5, 5A to 5I: Fine basic-pattern
6a: First laser-processed groove
6b: Second laser-processed groove
8, 8A to 8C: First-graphic
9, 9 to 9C: Second graphic
Ra1, Ra2, Ra3: Roughness of the surface

The invention claimed is:

1. A decorated-part of which a design, comprised of a plurality of a fine basic-pattern, is drawn onto a decorative-surface of a surface-layer of a part-material that is made of a resin compact, characterized in that the fine basic-pattern consists of a first-graphic that is drawn, including a first laser-processed groove, and of a second-graphic comprising multiply different-sized second-graphics, located in a region surrounded by the first-graphic, that is drawn, including a second laser-processed groove; the first graphic and the multiply different-sized second-graphics are homothetic in a planar view, wherein, in the planar view, relatively small multiply different-sized second-graphics are located within an area surrounded by relatively large multiply different-sized second-graphics, and further wherein an inner-surface roughness (Ra1) of the first laser-processed groove is greater than a decorative-surface roughness (Ra3) wherever the fine basic-pattern does not exist on said decorative-surface, and that an inner-surface roughness (Ra2) of the second laser-processed groove is greater than the inner-surface roughness (Ra1) of the first laser-processed groove.

2. A decorated-part according to claim 1, characterized in that the inner-surface roughness (Ra1) of the first laser-processed groove is less than 0.1 μm, and that the inner-surface roughness (Ra2) of the second laser-processed groove is 0.2 μm or more.

3. A decorated-part according to claim 1, characterized in that a size of the fine basic-pattern is 5 mm² or less.

4. A decorated-part according to claim 1, characterized in that the first-graphic and the multiply different-sized second-graphics are both a closed-homothetic graphic in planar-view.

5. A decorated-part according to claim 1, characterized in that the first-graphic and the multiply different-sized second-graphics are eccentrically arranged from a center of the fine basic-pattern.

6. A decorated-part according to claim 1, characterized in that the first-graphic and the multiply different-sized second-graphics are eccentrically arranged from a center of the fine basic-pattern and partially overlap.

7. A decorated-part according to claim 6, characterized in that the first-graphic and the multiply different-sized second-graphics are both circular-shaped in planar-view that constitute the fine basic-pattern representing a dimple.

8. A method for manufacturing a decorated-part according to claim 1 by a laser-irradiation process of which a design comprising a plurality of the same fine regularly-arranged basic-pattern is drawn onto the decorative-surface of the surface-layer of a part-material, characterized in that during the laser-irradiation process a laser is irradiated under the condition that the energy-level of the laser irradiated in forming the second laser-processed groove is set higher than that energy-level per-unit area of the laser irradiated in forming the first laser-process groove.

9. A method for manufacturing a decorated-part according to claim 6 by a laser-irradiation process of which a design comprising a plurality of the same fine regularly-arranged basic-pattern is drawn onto the decorative-surface of the surface-layer of a part-material, characterized in that during the laser-irradiation process a laser is irradiated in a unicursal manner under the condition that the energy-level of the laser irradiated in forming the second laser-processed groove is set higher than that energy-level per-unit area of the laser irradiated in forming the first laser-process groove.

* * * * *